United States Patent [19]
Damon

[11] 3,891,233
[45] June 24, 1975

[54] INFLATOR SEAL
[75] Inventor: William H. Damon, Newhall, Calif.
[73] Assignee: Allied Chemical Corporation, New York, N.Y.
[22] Filed: June 20, 1974
[21] Appl. No.: 481,293

[52] U.S. Cl.................... 280/150 AB; 137/516.17
[51] Int. Cl............................................ B60r 21/10
[58] Field of Search............ 280/150 AB; 222/3, 5; 102/39; 137/516.17

[56] References Cited
UNITED STATES PATENTS

| | | |
|---|---|---|
| 3,456,682 | 7/1969 | Blackford .................... 137/516.17 |
| 3,608,834 | 9/1971 | MacLaren ................. 137/516.17 X |
| 3,618,976 | 11/1971 | Leising et al. ................ 280/150 AB |
| 3,791,669 | 2/1974 | Hamilton ..................... 280/150 AB |
| 3,797,853 | 3/1974 | Grosch ................................... 222/5 |
| 3,819,203 | 6/1974 | Radke ........................ 280/150 AB |
| 3,827,715 | 8/1974 | Lynch .......................... 280/150 AB |

Primary Examiner—Kenneth H. Betts
Attorney, Agent, or Firm—Jonathan Plaut

[57] ABSTRACT

Gas supply device employing a seal means which on activation of the device serves as a diffuser through which the gas passes from the source to the point of use.

5 Claims, 4 Drawing Figures

PATENTED JUN 24 1975  3,891,233

INFLATOR SEAL

This invention relates to a gas supply device employing a seal means which on activation of the device serves as a diffuser through which the gas passes from the source to the point of use. More specifically, this invention relates to a gas supply device for use with inflatable structure to which the gas supply device supplies inflating gas, the device employing seal means including an adhesive in combination with a seal disc.

Generally, the invention is related to a gas supply device, which in one embodiment is a chamber filled with a gas producing propellant. The exit ports of that chamber are normally closed from the outside environment by the application of seal means thereover. When the propellant is activated so as to produce gas, the gas passes through the ports and, on the lifting of the seal disc and resulting rupturing of the adhesive employed with the seal disc, passes through the failed adhesive as directed by the seal disc to the inflatable device, such as an air bag for restraining an occupant of a motor vehicle.

According to applicant's invention, the seal disc is attached to cover the exit ports from the gas source by an adhesive. The seal disc and the adhesive comprise the seal means. When pressure generated by the gas, from the reacting propellant, for example, is raised past a certain prescribed level, the seal disc is raised from the gas source device in its positioning of overlying the discharge ports against the adhesive forces of the adhesive and the gas is directed to and passes through the adhesive to the point of use. The seal disc is designed in such a way as to aid in its lifting by the gas in its movement away from the discharge ports, as will be described in detail hereinafter. Preferably, the seal disc is attached to the gas source device by other fastening means, such as a rivet, so that the seal disc may move to a second point of attachment (to break the adhesive) without becoming disengaged from the gas source device.

Further details of the invention will be understood with relation to the following more detailed description and the following drawings.

DETAILED DESCRIPTION

Figure 1:
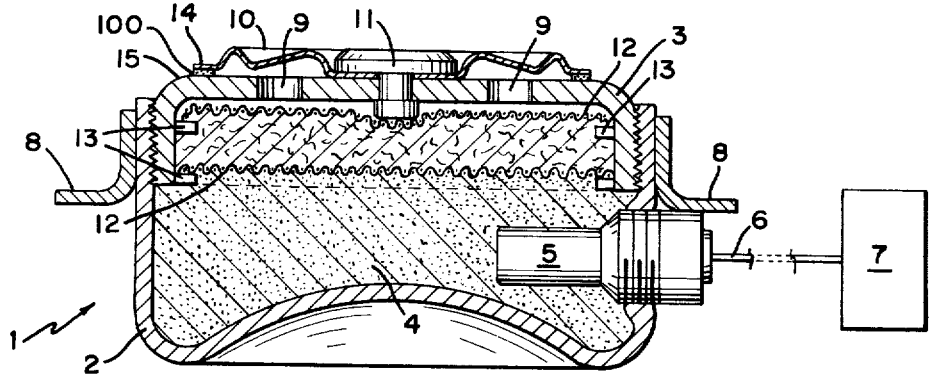
FIG. 1 shows the gas source device of the preferred embodiment.

The gas source device 1 of the preferred embodiment is made up of an outer encasing shell 2 and enclosing end piece 3, for example, made of chrome-moly steel. The end piece 3 may in one embodiment be threaded into the outer encasing shell 2. The chamber formed by the pieces 2 and 3, in one embodiment, is filled with a pyrotechnic powder, such as black powder 4, for example, which when it burns produces an inflating gas. Alternatively, a stored gas may be included within the chamber formed by structure 2 and 3, or a combination of stored gas and pyrotechnic powder may be employed, as is well known in the art, see for example, U.S. Pat. application Ser. No. 304,291 filed Nov. 6, 1972, now Pat. No. 3,837,671 and U.S. Pat. application Ser. No. 376,866, filed July 5, 1973, respectively. A squib or burning device 5 extends into the chamber through an opening in the encasement 2. The squib is connected as by electrical connection 6 to a sensor 7 which commands igniting of squib 5, causing burning of the powder 4, on certain predetermined conditions, such as sudden deceleration of a vehicle, in which the gas source is employed, as is well known in the art. The gas source may be mounted to vehicle structure, such as the steering wheel hub, by mounting brackets 8.

The cover 3 has gas discharge ports 9 through which gas evolved from the powder 4, in the preferred embodiment, is discharged from the gas source 1. Seal means including a seal disc 10 overlies the gas discharge ports 9 and is preferably attached to the end piece 3 by a rivet 11. Screens 12 mounted internally of the chamber to the cover 3 on mounting brackets 13 keeps the powder, in the preferred embodiment, in its unburned state within the gas source and contributes to the maintaining of the unburned powder within the gas source. The powder 4 may be either granular or may be formed as a ring or other pressed structure.

Figure 3:
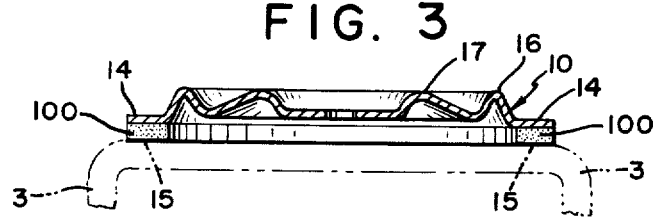
FIG. 3 shows the seal disc of the device of FIG. 1 with an enlarged indication of the adhesion of the seal disc to the gas source.

The seal disc 10, which may be formed of stainless steel or other metal structure, for example, is bonded by adhesive 100 (FIG. 3) at its ends 14 to the outside surface 15 of the end piece cover ocver 3. The adhesive 100 used may be a hot melt glue, such as an epoxy glue, or other adhesive, which when it hardens bonds the seal disc 10 to the cover 3 as shown in FIG. 3.

Figure 4:
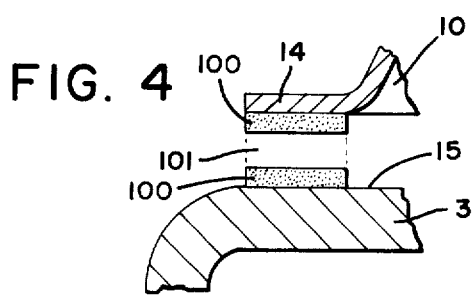
FIG. 4 shows the seal disc moved so that rupture has occurred in the adhesive.

The seal disc 10 preferably has at least one convolution 16, and preferably a plurality of convolutions 16 and 17, so as to give it strength, control deflection, and so as to provide area within the space between the seal disc and the cover 3 for the gas generated and exiting through ports 9 to collect and lift the outer portions of the seal disc against the adhesive force. The movement of the seal disc against the adhesive force will cause the adhesive to separate (see FIG. 4) and will allow the gas to pass there through (see channel 101 as illustrative) to the inflatable device. The attachment of the seal disc to the gas source 1, as by the rivet at its center, in the preferred embodiment, holds the seal disc to the gas source while the end sections 14 thereof are separated from the gas source to create the passage 101 as shown in FIG. 4 through which the gas passes through the adhesive to the inflatable device.

Figure 2:
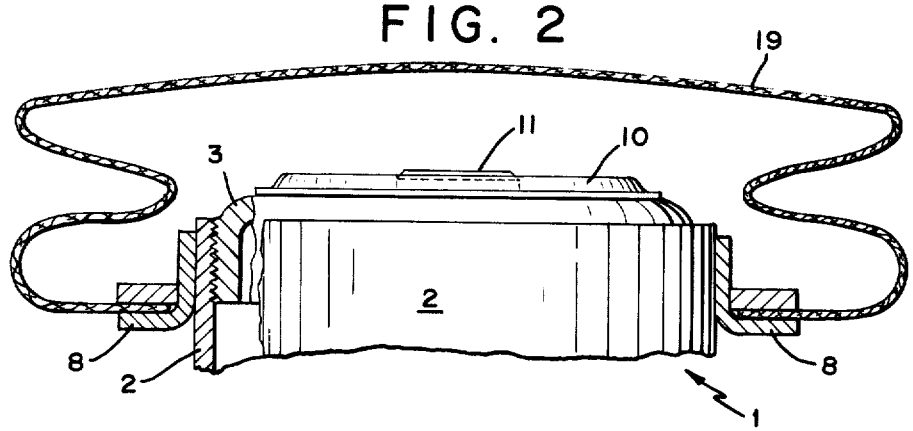
FIG. 2 shows the gas source device of FIG. 1 and a schematic showing of its connection to an inflatable device.

As shown in FIG. 2, the gas passing through the adhesive then passes, in one embodiment, to an air bag 19 for protection of an occupant of a motor vehicle (not shown).

The seal means thus provides the dual function of acting as a seal for the gas source and as a deflector for directing the gas produced in a direction perpendicular to the direction of its flow through the gas ports, as it passes through the adhesive.

As discussed, the convolutions in the seal disc provide the medium for lifting the seal at its end from the gas source device to spread the adhesive and provide the passageways therethrough. In one embodiment, the adhesive will hold the seal disc to the end piece up to pressures of 1000 psi, so that the adhesive won't separate (or rupture) until the gas force through the exit ports is up above that pressure. The use of the adhesive thus does not interfere with operation of the gas source since the gas exiting from the ports, in one embodiment, is exiting through the ports at a pressure of above 2000 psi.

Having described the invention in detail, it is applicant's intention that the scope of the invention be limited by the following claims.

I claim:

1. A source of gas including a chamber from which inflating gas is developed, exit ports at one side of said chamber, a seal means overlying said exit ports, said seal means including a seal disc and adhesive, said seal disc containing at least one convolution, said seal disc attached to said source by said adhesive binding the outer extent of said seal disc to said source, said adhesive rupturing at a pressure lower than the pressure of the inflating gas exiting from said source, said gas directed by said seal disc on exiting from said exit ports to pass through said adhesive on rupture thereof, and said seal disc further attached to said source at a location separate from the area of adhesion to said source.

2. A gas source as claimed in claim 1, said second point of attachment of said seal disc to said source being substantially in the center of said seal disc.

3. A gas source as claimed in claim 2, further including gas generation powder contained within said chamber and means for igniting said powder in said chamber responsive to external signal for ignition.

4. A gas source as claimed in claim 3, said seal disc containing a plurality of convolutions.

5. A gas source as claimed in claim 4, further including an inflatable restraint and manifold means connecting said restraint to said gas source to supply gas passing through said ruptured adhesive to said inflatable restraint.

* * * * *